US008678048B2

(12) United States Patent
Buchik (10) Patent No.: US 8,678,048 B2
(45) Date of Patent: Mar. 25, 2014

(54) DEVICE FOR DISPENSING EFFERVESCENT BEVERAGES AND A THREE-WAY VALVE (76) Inventor: Sergei Aleksandrovich Buchik, Novosibirsk (RU)

(*) Notice: Subject to any disclaimer, the term of this patent is extended or adjusted under 35 U.S.C. 154(b) by 800 days.

(21) Appl. No.: 12/935,696

(22) PCT Filed: Mar. 26, 2009

(86) PCT No.: PCT/RU2009/000141
§ 371 (c)(1),
(2), (4) Date: Nov. 15, 2010

(87) PCT Pub. No.: WO2009/123504
PCT Pub. Date: Oct. 8, 2009

(65) Prior Publication Data
US 2011/0049185 A1 Mar. 3, 2011

(30) Foreign Application Priority Data
Apr. 1, 2008 (RU) .............................. 2008112626

(51) Int. Cl.
*B67C 3/10* (2006.01)
*B67D 1/00* (2006.01)
*F16K 11/065* (2006.01)

(52) U.S. Cl.
CPC ................ *B67C 3/10* (2013.01); *F16K 11/065* (2013.01)
USPC .................. 141/48; 141/47; 141/49; 141/51; 137/625.4; 137/625.28; 137/602; 222/145.1

(58) Field of Classification Search
CPC .............. B67C 3/06; B67C 3/10; B67D 1/06; B67D 3/0054; B67D 1/1466; F16K 11/00; F16K 11/02; F16K 11/04; F16K 11/06; F16K 11/065; F16K 11/0655; F16K 11/0716; F16K 11/08
USPC ........... 141/69, 362, 4–7, 37, 47–48, 63, 285, 141/301, 302; 222/145.1; 137/625.4, 583, 137/587, 625, 625.37–625.39, 625.42, 600, 137/601.15, 602, 897, 605; 251/213, 231, 251/241, 238, 236, 242, 244–246, 339
See application file for complete search history.

(56) References Cited

U.S. PATENT DOCUMENTS

| | | | | |
|---|---|---|---|---|
| 1,157,215 A * | 10/1915 | Gille | ............................. | 251/324 |
| 2,011,329 A * | 8/1935 | Wayer | ...................... | 137/625.13 |
| 3,068,910 A * | 12/1962 | Jacobs | ............................. | 141/40 |
| 3,087,675 A * | 4/1963 | Honegger | ................... | 236/12.21 |
| 3,204,830 A * | 9/1965 | Harr | ..................... | 222/181.3 |
| 3,332,444 A * | 7/1967 | Harr | ..................... | 137/625.4 |
| 3,366,328 A * | 1/1968 | Feinberg | ..................... | 236/12.22 |
| 3,415,295 A * | 12/1968 | Wolf | ..................... | 141/46 |
| 3,590,874 A * | 7/1971 | Rice | ..................... | 137/625.48 |
| 3,802,471 A * | 4/1974 | Wickenhauser | ............... | 141/39 |
| 3,896,836 A * | 7/1975 | Labarre | ..................... | 236/12.22 |
| 3,946,770 A * | 3/1976 | Trinne et al. | ..................... | 141/5 |
| 4,212,322 A * | 7/1980 | Douglas et al. | .......... | 137/625.48 |
| 4,271,992 A * | 6/1981 | Becker | ..................... | 222/509 |
| 5,012,841 A * | 5/1991 | Kueffer | ..................... | 137/625.39 |
| 5,503,179 A * | 4/1996 | Till | ..................... | 137/240 |
| 5,884,677 A * | 3/1999 | McKaughan | ................. | 141/145 |
| 5,924,462 A * | 7/1999 | McKaughan | ................. | 141/145 |
| 6,164,083 A | 12/2000 | Leeming et al. | | |
| 6,189,578 B1 * | 2/2001 | Clusserath | ..................... | 141/7 |
| 6,234,202 B1 * | 5/2001 | Grill | ..................... | 137/596.17 |
| 6,736,172 B1 * | 5/2004 | Chetaille et al. | .............. | 141/177 |
| 7,188,751 B2 * | 3/2007 | Van Der Klaauw et al. | ..................... | 222/146.6 |
| 7,278,454 B2 * | 10/2007 | Younkle | ..................... | 141/374 |
| 7,571,749 B2 * | 8/2009 | Stocchi | ..................... | 141/91 |
| 7,600,530 B2 * | 10/2009 | Truitt et al. | ................... | 137/512 |
| 7,730,912 B2 * | 6/2010 | Blichmann | ..................... | 141/264 |
| 7,909,056 B2 * | 3/2011 | Truitt et al. | ..................... | 137/512 |
| 8,381,777 B2 * | 2/2013 | Lupi et al. | ..................... | 141/48 |
| 8,429,892 B2 * | 4/2013 | Tentorio | ..................... | 60/39.094 |
| 8,499,801 B2 * | 8/2013 | Wild et al. | ..................... | 141/10 |
| 8,505,442 B2 * | 8/2013 | Ishida et al. | ................. | 99/323.1 |

FOREIGN PATENT DOCUMENTS

| | | |
|---|---:|---|
| GB | 11468-A.D. 1911 | 0/1911 |
| RU | 13369 U1 | 10/2000 |
| RU | 2175735 C1 | 10/2001 |
| RU | 36371 U1 | 10/2004 |
| RU | 36372 U1 | 10/2004 |
| SU | 211248 | 11/1968 |

\* cited by examiner

*Primary Examiner* — Timothy L Maust
*Assistant Examiner* — Robert Bell, III
(74) *Attorney, Agent, or Firm* — Ladas & Parry LLP (57) ABSTRACT

The invention relates to the field of food industry, more particularly, to commercial equipment, and is useful in apparatuses for dispensing beer and other foaming and/or carbonated beverages from an isobaric storage to plastic bottles or glasses for sale in retail kiosks, shops, restaurants, and bars. The technical result of the present invention is a simplified maintenance both of the apparatus for a manual dispensing of beverages as a whole due to excluding the need for a sanitary treatment of a part of the filling pipe each time a container is filled and a simplified maintenance of taps due to eliminating the need for frequent washing of units and parts of these means after the dispensing of beer or another beverage is over. The technical result is reached by two embodiments of the three-way cock (63 и 64), which are installed in the apparatus for a manual dispensing of foaming and/or carbonated beverages to uncovered containers (54). The apparatus includes a housing (52) with a stage (53) for positioning an uncovered container (54) thereon and a filling pipe (55) mounted thereon for feeding a beverage, one end of the pipe (55) being arranged above the place where the uncovered container (54) is positioned. The apparatus is equipped with a cap (56) which is hermetically fastened to the stage, with an option of being disconnected, under which there are the filling pipe (55) and the place where the uncovered container (54) is positioned; a unit for fastening the cap and supplying or removing the container (54) from under it; and a unit for supplying under pressure a beverage or gas to underneath the cap (56) and removing the gas therefrom.

9 Claims, 6 Drawing Sheets

DEVICE FOR DISPENSING EFFERVESCENT BEVERAGES AND A THREE-WAY VALVE

The invention relates to the field of food industry, more particularly, to commercial equipment, and is useful in apparatuses for dispensing beer and other foaming and/or carbonated beverages from an isobaric storage to plastic bottles or glasses for sale in retail kiosks, shops, restaurants, and bars.

Flow-switch apparatuses are known for use in systems for dispensing various kinds of foaming beverages (see RU 13369 U1, U.S. Pat. No. 6,164,083), these apparatuses comprising a kit of taps, each installed in a pipeline connected to beverage storage. Each storage contains a beverage of a certain kind.

However, such flow-switch apparatuses do not provide the counter-pressure dispensing of beverages from isobaric storages to covered or uncovered containers (plastic bottles or mugs).

A multi-way cock is known for flow switching (see RU 2175735 C1), the cock comprising housing with an inlet mouth and several outlet mouths, a cover, a swing stem, and a seal made in the form of two ceramic disks contacting with each other. One of the disks is immovably fixed in the saddle of the housing and the other is mounted so as to allow an interaction with the swing stem. In the immovable disk, there are several through windows; in the movable disk, there is a pit for mouths to communicate with one another.

A drawback of this piece of the prior art consists of that flows can mix upon switching.

The closest prior art for the three-way cock of the present invention is a three-way flow switch of an apparatus for a manual dispensing of foaming and/or carbonated beverages, this switch comprising a cylinder-shaped housing with a cover wherein two through inlet holes and one outlet hole are made in the bottom of the housing and wherein an upper disk having an option of rotating and an immovably fixed lower disk are coaxially mounted inside the housing; the upper disk is rigidly connected via a hole in the cover to a lever positioned outside the housing of the three-way flow-switch, through holes are made in the lower disk coaxially to the holes in the bottom of the housing, and a sickle-shaped non-through groove is made in the body of the upper disk on the side facing the lower disk and opposing the holes therein for one inlet hole of the housing to communicate with the outlet hole thereof, wherein an elastic seal is made around the lever underneath the cover of the housing to press the upper disk and the lower disk to each other and to the bottom of the housing and wherein elastic annular seals are mounted in the holes of the bottom of the housing (see RU 36371 U1).

A drawback of this three-way flow switch consists of a low reliability of performance and difficulty of the maintenance thereof because of the need for washing disks and seals after the dispensing of beer or another foaming or carbonated beverage is over.

The closest art for the apparatus for a manual dispensing of beverages of the present invention consists of the apparatus for a manual dispensing of foaming and/or carbonated beverages to mugs or glasses comprising a housing equipped with a stage for positioning a mug or glass and a filling pipe mounted vertically on the stage for connecting it via a flow switch (cock) to a pressurized beer supply pipeline, the end of the pipe being positioned above the stage with a mug or glass and bent downward and toward the mug or glass (see U.S. Pat. No. 7,278,454). To the filling pipe, attached is an additional tipped pipe, which is lowered into a mug or glass and has a unit for laminarizing the beverage flow to reduce foaming during the dispensing of the beverage to the container.

A drawback of this apparatus is the need for a sanitary treatment of the tipped pipe each time a container is filled, which reduces the convenience of use of the apparatus and increases the time to serve a customer. Further, the apparatus fails to provide the counter-pressure dispensing of a beverage from isobaric storages to mugs and glasses, thereby considerably slowing down the dispensing of a beverage to small containers.

The technical result of the present invention is a simplified maintenance both of the apparatus for a manual dispensing of beverages as a whole due to excluding the need for a sanitary treatment of a part of the filling pipe each time a container is filled and a simplified maintenance of taps due to eliminating the need for frequent washing of units and parts of these means after the dispensing of beer or another beverage is over.

The technical result is reached by that, in a three-way cock (in the first embodiment) containing a hollow cylinder-shaped housing equipped with two inlet ducts and one outlet duct and a means for switching on or switching off one of the inlet ducts with the outlet duct mounted inside the housing with a control lever, according to the present invention, the hollow cylinder-shaped housing has three consecutively arranged annular compartments, the inlet ducts being connected to the first and third compartments and the outlet duct being connected to the second (middle-positioned) compartment, the means for switching on and switching off the inlet ducts contains a valve with an elastic face seal having an axial duct with an elastic annular seal, arranged in the third compartment of the housing, and positioned in the saddle of the valve with an option of an axial reciprocating movement thereof, and a stem arranged inside the housing of the cock with an option of an axial reciprocating movement thereof, one end of the stem going out the housing through its end wall and kinematically connected to the control lever and the other end positioned in the opposite third compartment of the housing, passing through the axial duct of the valve with the annual elastic seal, and kinematically connected thereto by means of a first spring which presses the valve from the end of the stem to the saddle of this valve, the saddle being formed by the ledge in the wall of the housing between the second compartment and the third compartment thereof and the annular ledge made on the stem; further, the stem has an axial duct closed on both ends by plugs, a first series of radial through holes made in the stein for communicating the axial duct thereof with the first compartment of the housing and a second series of radial through holes made in the stem behind the annular ledge thereof along the arrangement of the compartments of the housing for communicating the axial duct of the stem with the second compartment of the housing, wherein elastic annular seals are installed between the housing and the stem on both sides of the first compartment of the housing, and the second compartment and the third compartment are hermetically isolated from each other by means of the aforementioned valve. The valve can optionally be pressed in the axial direction to the saddle of the valve by means of a second spring through the stem, this second spring located around the stem and kinematically connected thereto and to the housing.

The aforementioned technical result is also reached by that in the three-way cock (a second embodiment) containing a hollow cylinder-shaped housing with two inlet or outlet ducts and one outlet or inlet duct and a means installed in the housing with a control lever for switching on or switching off one of the inlet or outlet ducts with the outlet or inlet duct, according to the presence invention, the hollow cylinder-shaped housing of the cock has three consecutively arranged annular compartments, the inlet or outlet ducts being connected to the first and third compartments and the inlet or outlet duct being connected to the second (middle-positioned) compartment; the means for switching on and switching off the outlet or inlet ducts contains two valves with elastic face seals having axial ducts with elastic annular seals, arranged in the second compartment of the housing of the cock, and positioned in the saddles of the valves with an option of an axial reciprocating movement thereof, and a stem arranged inside the housing with an option of an axial reciprocating movement thereof, one end of the stem going out the housing through the end wall thereof and kinematically connected to the control lever and the other end positioned in the first compartment of the housing and sealed to the wall thereof by means of an annular elastic seal, passing through the axial ducts of the valves with annual elastic seals, and kinematically connected thereto by means of a spring which is positioned around the stem between the annular valves and presses the valves to the saddles of these valves, the saddles being formed by the ledges in the wall of the housing between the first, second, and third compartments thereof and the annular ledges made on the stem; further, the end of the stem on the side opposing the lever has an axial duct with an open end having a length matching the size of the first compartment of the housing and communicating with this compartment via radial through holes made in the stem in front of the closed end of the axial duct thereof, wherein the first and third compartments are hermetically isolated from the second compartment by means of the aforementioned valves which are pressed by a spring in the axial direction to the saddles of these valves.

In both embodiments of the three-way cock, the control lever is equipped with a lock to fix the position thereof relative to the housing of the cock.

The aforementioned technical result is also reached by that in an apparatus for a manual dispensing of foaming and/or carbonated beverages to uncovered containers including a housing with a stage for positioning an uncovered container thereon and a filling pipe mounted thereon for feeding a beverage, one end of the pipe being arranged above the place where the uncovered container is positioned, according to the present invention, the apparatus is equipped with a cap which is hermetically fastened to the stage, with an option of being disconnected, under which there are the filling pipe and the place where the uncovered container is positioned; a unit for fastening the cap and supplying or removing the container from under it; and a unit for supplying under pressure a beverage or gas to underneath the cap and removing the gas therefrom. The unit for supplying under pressure the beverage or gas to underneath the cap and removing the gas therefrom contains a flow switch, through which the inlet end of the filling pipe is connected to a beverage supply pipeline for supplying the beverage from the isobaric storage and a gas supply pipeline for supplying the gas from the gas cylinder, and a pipe having one end thereof connected to the internal space of the cap and the other connected with the atmosphere through the flow switch.

The flow switch is embodied in the form of two three-way cocks equipped with control levers according to claims 1 and 3, wherein the outlet duct of the first cock (according to claim 1) is connected to the filling pipe, two inlet ducts are connected with, respectively, the gas supply pipeline for supplying the gas from the gas cylinder and the beverage supply pipeline for supplying the beverage from the isobaric capacity, and the second cock (according to claim 3) contains an inlet duct connected via a pipeline to the end of the pipe for removing the gas from under the cap and two outlet ducts for gas release, one being connected to the second cock via a throttle for controlling the leaving gas flow rate from the removable cap.

The unit for fastening the cap and for supplying or removing a container from under the cap contains an annular elastic seal, positioned on the stage of the housing and having the size matching the size of the end of the removable cap, and bayonet connections arranged on the stage and the removable cap around the end of the cap and around the annular elastic seal.

Figure 1:
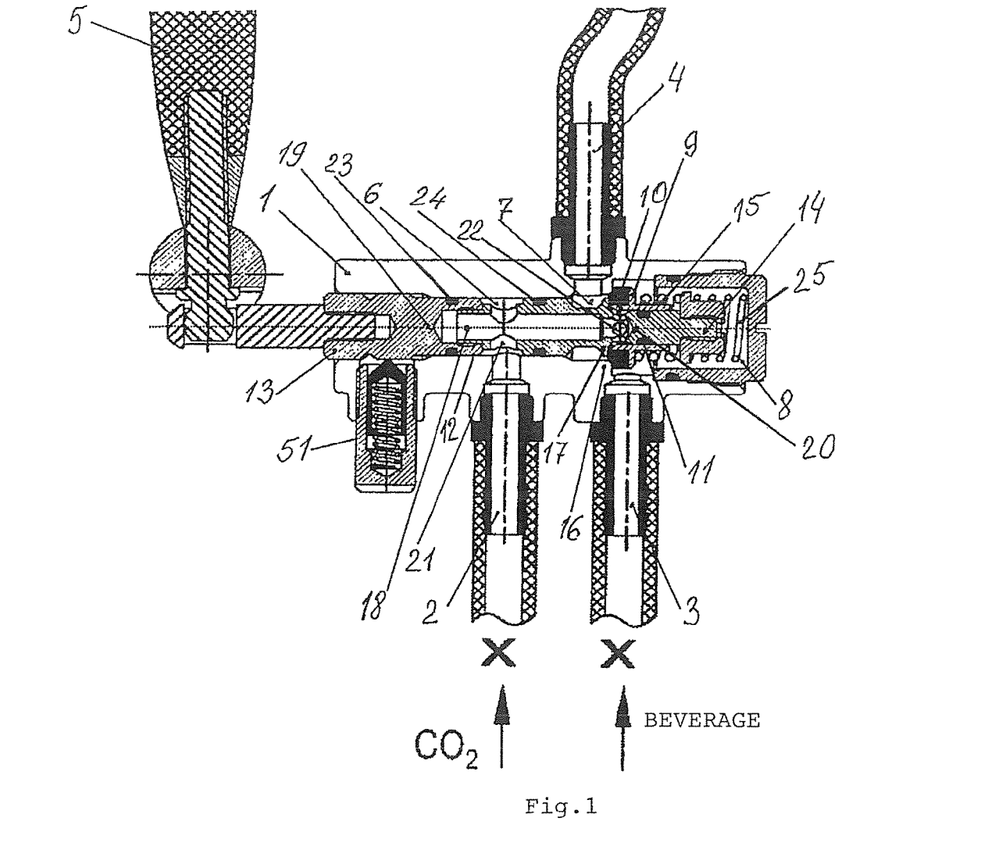
FIG. 1 represents a scheme of the three-way cock in the initial position (the first embodiment)

In the first embodiment, the three-way cock contains a hollow cylinder-shaped housing 1 equipped with two inlet ducts 2 and 3 and one outlet duct 4 and a means installed inside the housing 1 with a control lever 5 for switching on or switching off one of the inlet ducts 2 and 3 with the outlet duct 4. The hollow cylinder-shaped housing 1 has three consecutively arranged annular compartments 6, 7, and 8, the inlet ducts 2 and 3 being connected to the first compartment 6 and the third compartment 7, respectively, and the outlet duct 4 being connected to the second (middle-positioned) compartment 7. The means for switching on and switching off the inlet ducts contains a valve 9 with an elastic face seal 10, this valve having an axial duct with an elastic annular seal 11, arranged in the third compartment 8 of the housing 1 and positioned in the saddle of the valve 9 with an option of an axial reciprocating movement thereof. A stem 12 is arranged inside the housing of the cock with an option of an axial reciprocating movement thereof, one end 13 of the stem going out the housing 1 through the end wall thereof and kinematically connected to the control lever 5 and the other end 14 of the stem positioned in the opposite third compartment 8 of the housing 1, the stem passing through the axial duct of the valve 9 with the annual elastic seal 10 and kinematically connected thereto by means of a first spring 15 which presses the valve 9 from the end 14 of the stem 12 to the saddle of the valve 9. The saddle of the valve 9 is formed by the ledge 16 made in the wall of the housing 1 between the second compartment 7 and the third compartment 8 thereof and the annular ledge 17 made on the stem 12. The stem 12 has an axial duct 18 closed on both ends thereof by plugs 19 and 20, a first series of radial through holes 21 made in the stem 12 for communicating the axial duct 18 thereof with the first compartment 6 of the housing and a second series of radial through holes 22 made in the stem 12 behind the annular ledge 17 thereof along the arrangement of the compartments 6-8 of the housing for connecting the axial duct 18 of the stem with the second compartment 7 of the housing. Elastic annular seals 23 and 24 are installed between the housing 1 and the stem 12 on both sides of the first compartment 6 of the housing, and the second compartment 7 and the third compartment 8 are hermetically isolated from each other by means of the valve 9. Further, the valve 9 is pressed in the axial direction to the saddle of this valve by means of a second spring 25 through the stem 12, this second spring located around the stem and kinematically connected thereto and to the housing 1.

Figure 2:
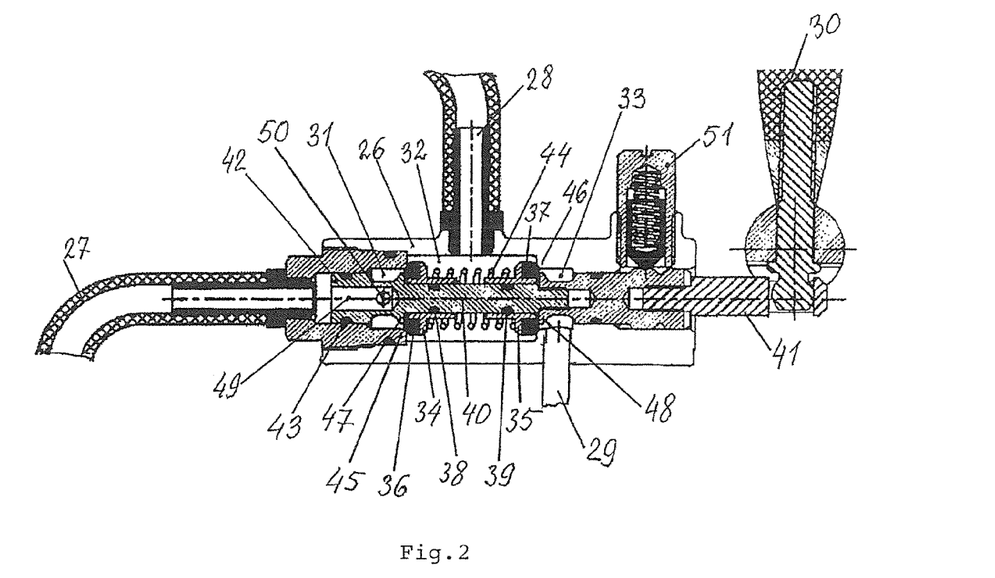
FIG. 2 represents a scheme of the three-way cock in the initial position (the first embodiment)

In the second embodiment, the three-way cock contains a hollow housing 26 with two inlet or outlet ducts 27 and 28 and one outlet or inlet duct 29 and a means installed inside the housing with a control lever 30 for switching on or switching off one of the inlet or outlet ducts 27 and 28 with the outlet or inlet duct 29. The hollow cylinder-shaped housing 26 of the cock has three consecutively arranged annular compartments 31, 32, and 33, the inlet or outlet ducts 27 and 28 being connected to the first compartment 31 and the third compartment 33 and the inlet or outlet duct 29 being connected to the second (middle-positioned) compartment 32. The means for switching on and switching off the outlet or inlet ducts 26 and 27 contains two valves 34 and 35 with elastic face seals 36 and 37 having axial ducts with elastic annular seals 38 and 39, arranged in the second compartment 32 of the housing of the cock and positioned in the saddles of the valves 34 and 35 with an option of an axial reciprocating movement thereof. A stem 40 is arranged inside the housing 26 with an option of an axial reciprocating movement thereof, one end 41 of the stem going out the housing through the end wall thereof and kinematically connected to the control lever 30 and the other end 42 thereof positioned in the first compartment 31 of the housing and sealed to the wall thereof by means of an annular elastic seal 43, the stem passing through the axial ducts of the valves 34 and 35 with annual elastic seals and kinematically connected thereto by means of a spring 44 which is located around the stem 40 between the annular valves 34 and 35 and presses the valves to the saddles of the valves 34 and 35. The saddles of the valves 34 and 35 are formed by ledges 45 and 46 made in the wall of the housing 26 between the first, second, and third compartments 31-33 thereof and annular ledges 47 and 48 made on the stem 40. The end 42 of the stem on the side opposing the lever has an axial duct 49 with an open end having a length matching the size of the first compartment 31 of the housing and communicating with this compartment via radial through holes 50 made in the stem 40 in front of the plugged end of the axial duct 49 of the stem. The first compartment 31 and the third compartment 33 are hermetically isolated from the second compartment 32 by means of the aforementioned valves 34 and 35 which are pressed by the spring 44 in the axial direction to the saddles of these valves.

In both embodiments of the three-way cock, the control lever (5 or 30) of the cock is equipped with a lock 51 to fix the position thereof relative to the housing (1 or 26) of the cock.

Both embodiments of the aforementioned cocks are used in an apparatus for a manual dispensing of foaming and/or carbonated beverages to uncovered containers.

Figure 3:
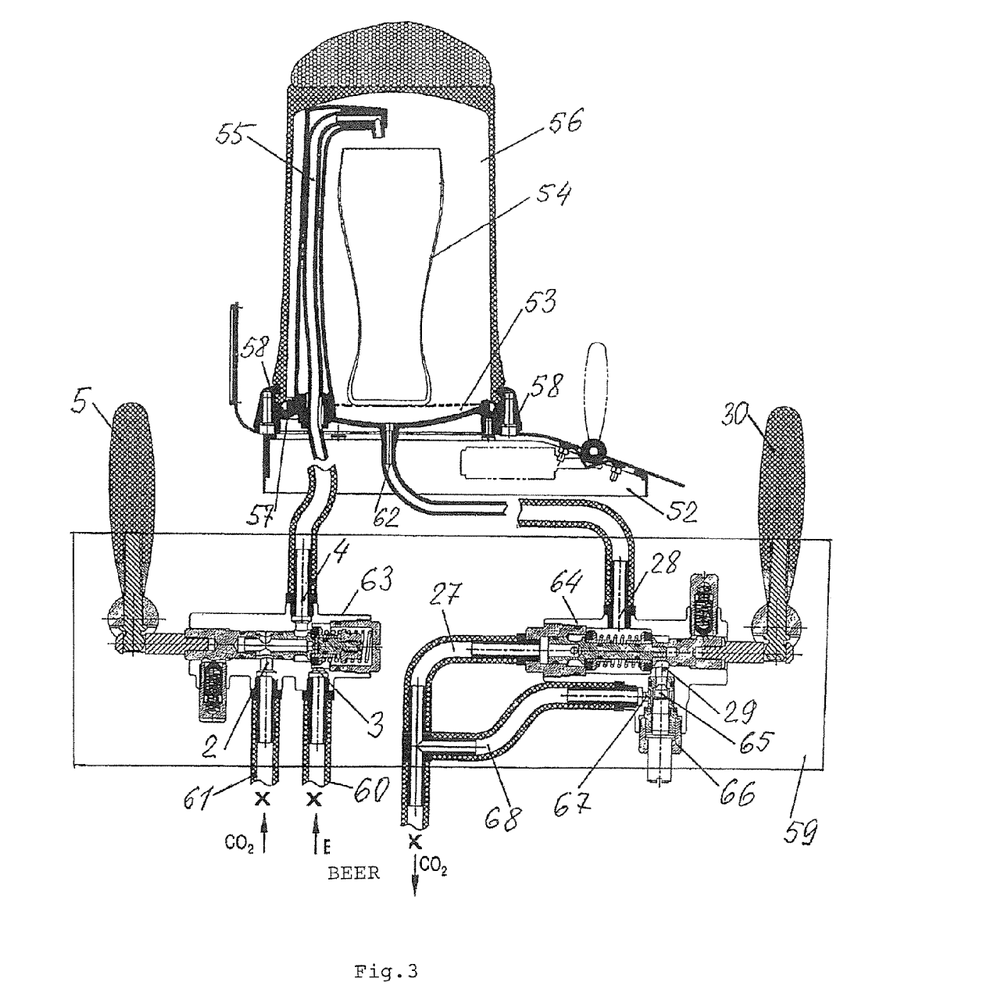
FIG. 3 represents a scheme of the apparatus for a manual dispensing of foaming and/or carbonated beverages to uncovered containers (in the initial position) containing the claimed embodiments of the three-way cock.

The apparatus includes a housing 52 with a stage 53 for positioning an uncovered container 54 thereon and a filling pipe 55 mounted thereon for feeding a beverage. One end of the pipe 55 is arranged above the place where the uncovered container 54 is positioned. The apparatus is equipped with a cap 56 which is hermetically fastened to the stage, with an option of being disconnected, under which there are the filling pipe 55 and the place where the uncovered container 54 is positioned; a unit for fastening the cap and supplying or removing the container 54 from under it; and a unit for supplying under pressure a beverage or gas to underneath the cap 56 and removing the gas therefrom.

The means (FIG. 3) for fastening the cap and supplying or removing the container 54 from under the cap 56 contains an annular elastic seal 57 positioned on the stage 53 of the housing, having the size matching the size of the end of the removable cap 56, and bayonet connections 58 positioned on the stage 53 and the removable cap 56 around the end of the latter and around the annular elastic seal 57.

The unit for supplying under pressure a beverage or gas to underneath the cap 56 and for removing the gas therefrom contains a flow switch 59, through which the inlet end of the filling pipe 55 is connected to a beverage supply pipeline 60 for supplying the beverage from the isobaric storage and to a gas supply pipeline 61 for supplying the gas from the gas cylinder; and a pipe 62 having one end thereof connected to the internal space of the cap and the other connected with the atmosphere through the flow switch 59.

The flow switch is embodied in the form of two three-way cocks 63 and 64 with control levers 5 and 30. The outlet duct 4 of the cock 63 is connected to the filling pipe 55; the two inlet ducts 2 and 3 thereof are, respectively, connected to the beverage supply pipeline 60 for supplying the beverage from isobaric storage and to the gas supply pipeline 61 for supplying the gas from the gas cylinder. The second cock 64 contains an inlet duct 28, which is connected to the end of the pipe 62 for removing the gas from under the cap 56, and two outlet ducts 29 and 27 for gas release. The duct 29 of the cock 64 is connected to the inlet duct 65 of a throttle 66 for controlling the removed gas flow rate from the removable cap 56, and the outlet duct 67 is connected to the outlet duct 27 of the cock 64 by means of the pipe 68.

The three-way cocks in the apparatus for a manual dispensing of foaming and/or carbonated beverages to uncovered containers and the apparatus itself operate in the following manner.

Figure 4:
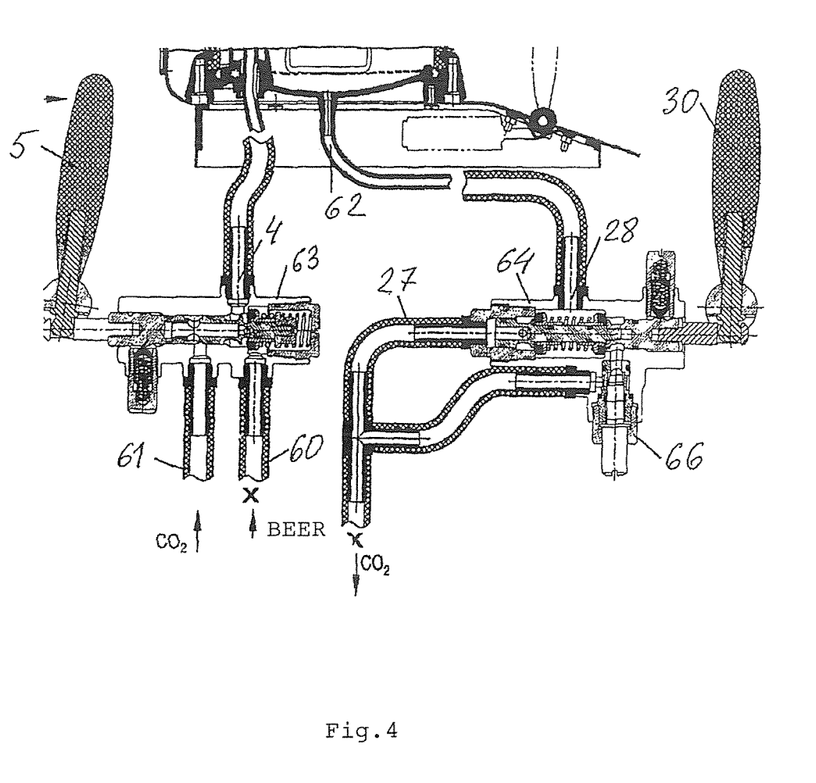
FIG. 4 represents a scheme of the apparatus for a manual dispensing of foaming and/or carbonated beverages to uncovered containers (in the position where gas supply ducts are open) containing the claimed embodiments of the three-way cock.
Figure 5:
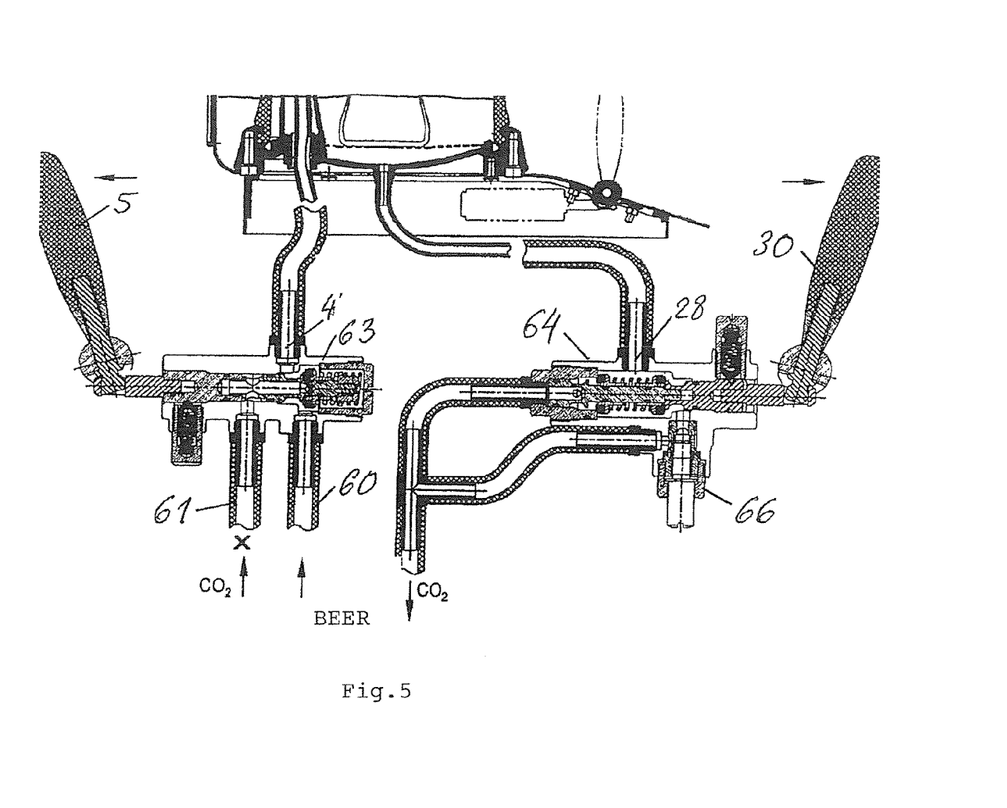
FIG. 5 represents the same in the position where beverage supply ducts are open.
Figure 6:
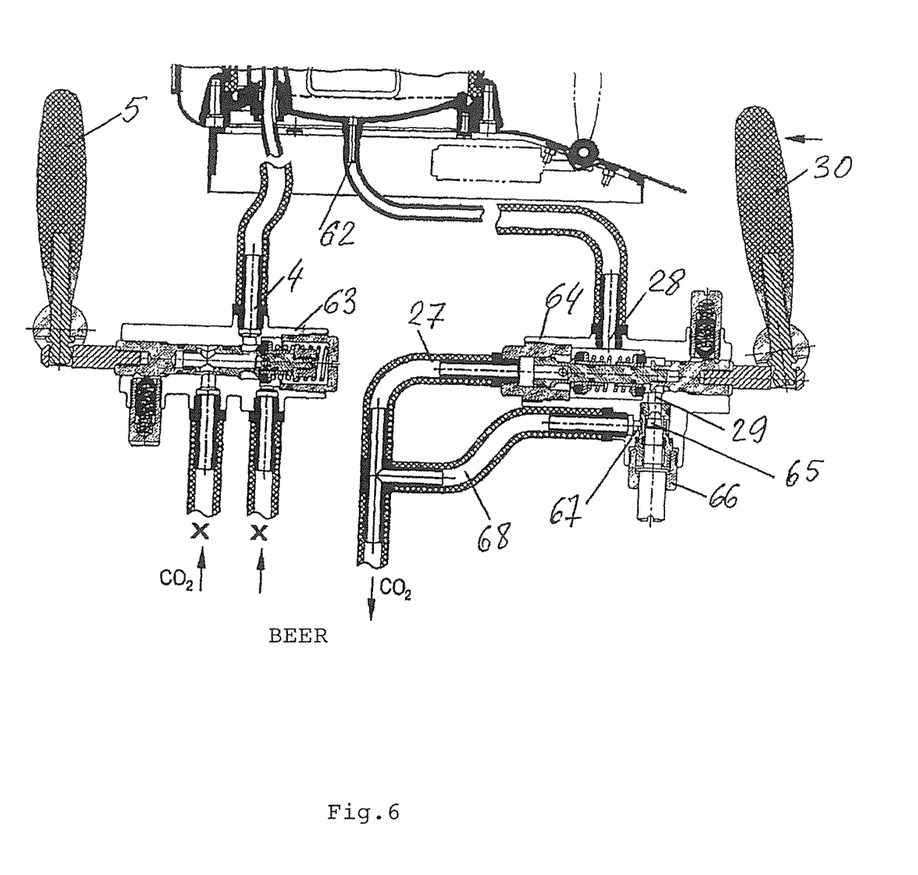
FIG. 6 represents the same in the position where gas release ducts are open.

According to the scheme (FIG. 3), the apparatus is used for a manual filling of an uncovered container (a glass or a mug) with a foaming and/or carbonated beverage from an isobaric storage under counter-pressure. For this purpose, for example, the glass 54 is placed on the stage 53 under the end of the filling pipe 55 and is covered with a removable cap 56, which is hermetically connected to the stage 53 by means of the annular elastic seal 57 and bayonet connections 58. While so doing, the throttle 66 is closed. The levers 5 and 30 of the three-way cocks 63 and 64 (FIG. 3) are in a neutral vertical position, indicating that these cocks are in the closed position. Then, the lever 5 (FIG. 4) of the three-way cock 63 is declined by 20 degrees outward the operator to move the stem 12 by compressing the spring 15 and expanding the additional spring 25 (FIG. 4). The valve 9 remains pressed to the saddle, and the radial holes 22 open and provide the communication of the chamber 6 with the chamber 7. The duct 2, which is connected via the pipeline 61 to the gas cylinder, communicates via the chamber 6, radial holes 21, axial duct 18, radial holes 22, chamber 7, outlet duct 4, and filling pipe 55 with the internal space of the removable cap 56. Gaseous $CO_2$ from the cylinder is supplied to underneath the cap 56, where the pressure is equalized to the pressure in the gas cylinder. Then, the lever 5 of the three-way cock 63 (FIG. 5) is deflected by 40 degrees in the opposite direction. Upon this, the stem 12, together with the valve 9, moves to open the latter, by expanding the spring 15 and compressing the additional spring 25. Once the valve 9 is open, the chambers 7 and 8 are in communication with each other. The duct 3, which is connected by means of the pipeline 60 to the isobaric beverage storage, communicates via chambers 8 and 7, duct 4, and filling pipe 55 with the internal space of the removable cap 56. Inasmuch as the pressure under the cap 56 and in the isobaric storage is the same, the beverage is not supplied to underneath the said cap 56. Then, the lever 30 (FIG. 5) of the three-way cock 64 is deflected by 20 degrees toward the operator to move the stem 40 by compressing the spring 44 (FIG. 5). The valve 34 remains pressed to the saddle (that is, it is closed), and the valve 35 opens to connect the inlet duct 28 through the chambers 32 and 33 to the throttle 66. Then, while the cocks 63 and 64 are in the position shown in FIG. 5, the throttle 66 is open and gaseous $CO_2$ through the pipe 62, the inlet duct 28, the chambers 32 and 33, and the ducts 65 and 67 of the throttle 66 is forced out from under the cap 56 to the atmosphere. A pressure difference is created between the inside of the isobaric storage and underneath the cap 56, causing the beverage to fill the glass 54. Elimination of foaming is provided by creating, a gas pressure in the dispensing system and above the beverage surface in the glass 54, this pressure exceeding the saturation pressure of the gas dissolved in the beverage. Once the glass 54 is filled with the beverage, in order to stop the further supply of the beverage from the isobaric storage, the lever 5 of the cock 63 is deflected (by 20 degrees) to the neutral initial vertical position (as in FIG. 6) together with the stem 12 and the valve 9, thereby closing the three-way cock 63. The residual gas from under the cap 56 and in part the dissolved gas released from the beverage are removed by deflecting the lever 30 of the cock 64 by 40 degrees to the other extreme position (FIG. 6) of the displacement of the stem 40 by compressing the spring 44. The valve 35 returns to the initial closed position thereof, and the valve 34 opens to communicate the inlet duct 28 to the atmosphere via the chambers 32 and 31, radial holes 50, axial duct 49, and pipe 27. After the pressure under the removable cap 56 is equalized to the atmospheric pressure, the levers 5 and 30 of both cocks 63 and 64 are put in the initial vertical position where these cocks are in the closed position (FIG. 3), the cap 56 is turned to disconnect the bayonet connections 58, the cap 56 is removed, and the glass 54 filled with the beverage is given to the customer.

The three-way cocks and the apparatus for a manual dispensing of foaming and/or carbonated beverages to uncovered containers of the present invention provide a simplified maintenance of the apparatus as a whole due to excluding the need for a sanitary treatment of a part of the filling pipe after each filling of a container, and a simplified maintenance of taps due to excluding the need for frequent washing of units and parts of these means after the dispensing of beer or another beverage is over.

What I claim is:

1. A three-way cock comprising a hollow cylinder-shaped housing (1) with two inlet ducts (2 and 3) and one outlet duct (4) and a means installed inside the housing (1) with a control lever (5) for switching on or switching off one of the inlet ducts (2 and 3) with the outlet duct (4), wherein the hollow cylinder-shaped housing (1) has three consecutively arranged annular compartments (6, 7, and 8), the inlet ducts (2 and 3) being connected to the first compartment (6) and the third compartment (7), respectively, and the outlet duct (4) being connected to the second (middle-positioned) compartment (7); the means for switching on and switching off the inlet ducts contains a valve (9) with an elastic face seal (10), the valve having an axial duct with an elastic annular seal (11) arranged in the third compartment (8) of the housing (1) and positioned in a saddle of the valve (9) with an option of an axial reciprocating movement thereof; a stem (12) of the valve arranged inside the housing of the cock with an option of an axial reciprocating movement thereof, one end (13) of the stem going out the housing (1) through the end wall thereof and kinematically connected to the control lever (5) and the other end (14) of the stem positioned in the opposite third compartment (8) of the housing (1), passes through the axial duct of the valve (9) sealed with the annual elastic seal (10) and is kinematically connected thereto by means of a first spring (15) which presses the valve (9) from the end (14) of the stem (12) to the saddle of the valve, which is formed by a ledge (16) made in the wall of the housing (1) between the second compartment (7) and the third compartment (8) thereof and an annular ledge (17) made on the stem (12); and further the stem (12) has an axial duct (18) closed on both ends thereof by plugs (19) and (20), a first series of radial through holes (21) made in the stem (12) for communicating the axial duct (18) thereof with the first compartment (6) of the housing and a second series of radial through holes (22) made in the stem (12) behind the annular ledge (17) thereof along the arrangement of the compartments (6), (7), and (8) of the housing for connecting the axial duct (18) of the stem with the second compartment (7) of the housing, wherein elastic annular seals (23) and (24) are installed between the housing (1) and the stem (12) on both sides of the first compartment (6) of the housing (1), and the second compartment (7) and the third compartment (8) are hermetically isolated from each other by means of the valve (9).

2. The three-way cock of claim 1, wherein valve (9) is further pressed in the axial direction to the saddle of this valve by means of a second spring (25) via the stem (12), this second spring being located around the stem (12) and kinematically connected thereto and to the housing (1).

3. A three-way cock comprising a hollow cylinder-shaped housing (26) with two inlet or outlet ducts (27) and (28) and one outlet or inlet duct (29) and a means installed inside the housing with a control lever (30) for switching on or switching off one of the inlet or outlet ducts (27 and 28) with the outlet or inlet duct (29), wherein the hollow cylinder-shaped housing (26) of the cock has three consecutively arranged annular compartments (31, 32, and 33), the inlet or outlet ducts (27) and (28) being connected to the first compartment (31) and the third compartment (33) and the outlet or inlet duct (29) being connected to the second (middle-positioned) compartment (32); the means for switching on and switching off the outlet or inlet ducts (26) and (27) contains two valves (34) and (35) with elastic face seals (36) and (37) having axial ducts with elastic annular seals (38) and (39) arranged in the second compartment (32) of the housing of the cock and positioned in the saddles of the valves (34) and (35) with an option of an axial reciprocating movement thereof; and a stem (40) arranged inside the housing (26) with an option of an axial reciprocating movement thereof, one end (41) of the stem going out the housing through the end wall thereof and kinematically connected to the control lever (30) and the other end (42) thereof positioned in the first compartment (31) of the housing and sealed to the wall thereof by means of an annular elastic seal (43), passes through the axial ducts of the valves (34) and (35) with annual elastic seals and is kinematically connected thereto by means of a spring (44) which is located around the stem (40) between the annular valves (34) and (35) and presses to the saddles of these valves formed by ledges (45) and (46) made in the wall of the housing (26) between the first, second, and third compartments (31, 32, and 33) thereof and annular ledges (47) and (48) made on the stem (40); and further the end (42) of the stem on the side opposing the lever has an axial duct (49) with an open end having a length matching the size of the first compartment (31) of the housing and communicating with this compartment via radial through holes (50) made in the stem (40) in front of the plugged end of the axial duct (49) of the stem, wherein the first compartment (31) and the third compartment (33) are hermetically isolated from the second compartment (32) by means of the aforementioned valves (34 and 35) which are pressed by the spring (44) in the axial direction to the saddles of these valves.

4. The three-way cock of claim 1, wherein the control lever (5 or 30) of the cock is equipped with a lock (51) for fixing the position thereof relative to the housing (1 or 26) of the cock.

5. An apparatus for a manual dispensing of foaming and/or carbonated beverages to uncovered container comprising a housing (52) with a stage (53) for positioning an uncovered container (54) thereon and a filling pipe (55) mounted thereon for feeding a beverage, one end of the pipe (55) being arranged above the place where the uncovered container (54) is positioned, wherein the apparatus is equipped with a cap (56) which is hermetically fastened to the stage, with an option of being disconnected, under which there are the filling pipe (55) and the place where the uncovered container (54) is positioned; a unit for fastening the cap and supplying or removing the container (54) from under it; and a unit for supplying under pressure a beverage or gas to underneath the cap (56) and removing the gas therefrom containing a flow switch (59), through which the inlet end of the filling pipe (55) is connected to a beverage supply pipeline (60) for supplying the beverage from the isobaric storage and a gas supply pipeline (61) for supplying the gas from the gas cylinder; and a pipe (62) having one end thereof connected to the internal space of the cap and the other connected with the atmosphere through the flow switch (59), wherein the flow switch (59) is embodied in the form of two three-way cocks (63 and 64) equipped with control levers (5 and 30); an outlet duct (4) of the first cock (63) is connected to the filling pipe (55); two inlet ducts (3 and 2) are connected with, respectively, the gas supply pipeline (61) for supplying the gas from the gas cylinder and the beverage supply pipeline (60) for supplying the beverage from the isobaric capacity; and the second cock (64) contains an inlet duct (28) connected via a pipeline to the end of the pipe (62) for removing the gas from under the cap (56) and two outlet ducts (29 and 27) for gas release, one being connected to the second cock (64) via a throttle (66) for controlling the leaving gas flow rate from the removable cap (56).

6. An apparatus of claim 5, wherein the unit for fastening the cap (56) and for supplying or removing the container (54) from under the cap contains the elastic annular seal (57) positioned on the stage (53) of the housing (52), the size of the seal matching the size of the end of the removable cap (56), and bayonet connections (58) arranged on the stage (53) and the removable cap (56) around the end of the latter and around the annular elastic seal (57).

7. An apparatus for a manual dispensing of foaming and/or carbonated beverages to uncovered container as claimed in claim 5, wherein said first cock is a three-way cock comprising a hollow cylinder-shaped housing (1) with two inlet ducts (2 and 3) and one outlet duct (4) and a means installed inside the housing (1) with a control lever (5) for switching on or switching off one of the inlet ducts (2 and 3) with the outlet duct (4), wherein the hollow cylinder-shaped housing (1) has three consecutively arranged annular compartments (6, 7, and 8), the inlet ducts (2 and 3) being connected to the first compartment (6) and the third compartment (7), respectively, and the outlet duct (4) being connected to the second (middle-positioned) compartment (7); the means for switching on and switching off the inlet ducts contains a valve (9) with an elastic face seal (10), the valve having an axial duct with an elastic annular seal (11) arranged in the third compartment (8) of the housing (1) and positioned in a saddle of the valve (9) with an option of an axial reciprocating movement thereof; a stem (12) of the valve arranged inside the housing of the cock with an option of an axial reciprocating movement thereof, one end (13) of the stem going out the housing (1) through the end wall thereof and kinematically connected to the control lever (5) and the other end (14) of the stem positioned in the opposite third compartment (8) of the housing (1), passes through the axial duct of the valve (9) sealed with the annual elastic seal (10) and is kinematically connected thereto by means of a first spring (15) which presses the valve (9) from the end (14) of the stem (12) to the saddle of the valve, which is formed by a ledge (16) made in the wall of the housing (1) between the second compartment (7) and the third compartment (8) thereof and an annular ledge (17) made on the stem (12); and further the stem (12) has an axial duct (18) closed on both ends thereof by plugs (19) and (20), a first series of radial through holes (21) made in the stem (12) for communicating the axial duct (18) thereof with the first compartment (6) of the housing and a second series of radial through holes (22) made in the stem (12) behind the annular ledge (17) thereof along the arrangement of the compartments (6), (7), and (8) of the housing for connecting the axial duct (18) of the stem with the second compartment (7) of the housing, wherein elastic annular seals (23) and (24) are installed between the housing (1) and the stem (12) on both sides of the first compartment (6) of the housing (1), and the second compartment (7) and the third compartment (8) are hermetically isolated from each other by means of the valve (9).

8. An apparatus for a manual dispensing of foaming and/or carbonated beverages to uncovered container as claimed in claim 5, wherein said second cock is a three-way cock comprising a hollow cylinder-shaped housing (26) with two inlet or outlet ducts (27) and (28) and one outlet or inlet duct (29) and a means installed inside the housing with a control lever (30) for switching on or switching off one of the inlet or outlet ducts (27 and 28) with the outlet or inlet duct (29), wherein the hollow cylinder-shaped housing (26) of the cock has three consecutively arranged annular compartments (31, 32, and 33), the inlet or outlet ducts (27) and (28) being connected to the first compartment (31) and the third compartment (33) and the outlet or inlet duct (29) being connected to the second (middle-positioned) compartment (32); the means for switching on and switching off the outlet or inlet ducts (26) and (27) contains two valves (34) and (35) with elastic face seals (36) and (37) having axial ducts with elastic annular seals (38) and (39) arranged in the second compartment (32) of the housing of the cock and positioned in the saddles of the valves (34) and (35) with an option of an axial reciprocating movement thereof; and a stem (40) arranged inside the housing (26) with an option of an axial reciprocating movement thereof, one end (41) of the stem going out the housing through the end wall thereof and kinematically connected to the control lever (30) and the other end (42) thereof positioned in the first compartment (31) of the housing and sealed to the wall thereof by means of an annular elastic seal (43), passes through the axial ducts of the valves (34) and (35) with annual elastic seals and is kinematically connected thereto by means of a spring (44) which is located around the stem (40) between the annular valves (34) and (35) and presses to the saddles of these valves formed by ledges (45) and (46) made in the wall of the housing (26) between the first, second, and third compartments (31, 32, and 33) thereof and annular ledges (47) and (48) made on the stem (40); and further the end (42) of the stem on the side opposing the lever has an axial duct (49) with an open end having a length matching the size of the first compartment (31) of the housing and communicating with this compartment via radial through holes (50) made in the stem (40) in front of the plugged end of the axial duct (49) of the stem, wherein the first compartment (31) and the third compartment (33) are hermetically isolated from the second compartment (32) by means of the aforementioned valves (34 and 35) which are pressed by the spring (44) in the axial direction to the saddles of these valves.

9. An apparatus for a manual dispensing of foaming and/or carbonated beverages to uncovered container as claimed in claim 7, wherein said second cock is a three-way cock comprising a hollow cylinder-shaped housing (26) with two inlet or outlet ducts (27) and (28) and one outlet or inlet duct (29) and a means installed inside the housing with a control lever (30) for switching on or switching off one of the inlet or outlet ducts (27 and 28) with the outlet or inlet duct (29), wherein the hollow cylinder-shaped housing (26) of the cock has three consecutively arranged annular compartments (31, 32, and 33), the inlet or outlet ducts (27) and (28) being connected to the first compartment (31) and the third compartment (33) and the outlet or inlet duct (29) being connected to the second (middle-positioned) compartment (32); the means for switching on and switching off the outlet or inlet ducts (26) and (27) contains two valves (34) and (35) with elastic face seals (36) and (37) having axial ducts with elastic annular seals (38) and (39) arranged in the second compartment (32) of the housing of the cock and positioned in the saddles of the valves (34) and (35) with an option of an axial reciprocating movement thereof; and a stem (40) arranged inside the housing (26) with an option of an axial reciprocating movement thereof, one end (41) of the stem going out the housing through the end wall thereof and kinematically connected to the control lever (30) and the other end (42) thereof positioned in the first compartment (31) of the housing and sealed to the wall thereof by means of an annular elastic seal (43), passes through the axial ducts of the valves (34) and (35) with annual elastic seals and is kinematically connected thereto by means of a spring (44) which is located around the stem (40) between the annular valves (34) and (35) and presses to the saddles of these valves formed by ledges (45) and (46) made in the wall of the housing (26) between the first, second, and third compartments (31, 32, and 33) thereof and annular ledges (47) and (48) made on the stem (40); and further the end (42) of the stem on the side opposing the lever has an axial duct (49) with an open end having a length matching the size of the first compartment (31) of the housing and communicating with this compartment via radial through holes (50) made in the stem (40) in front of the plugged end of the axial duct (49) of the stem, wherein the first compartment (31) and the third compartment (33) are hermetically isolated from the second compartment (32) by means of the aforementioned valves (34 and 35) which are pressed by the spring (44) in the axial direction to the saddles of these valves.

* * * * *